Sept. 17, 1935.  J. O. ALMEN  2,014,921
HOOP TYPE GOVERNOR
Filed June 20, 1932   3 Sheets-Sheet 1
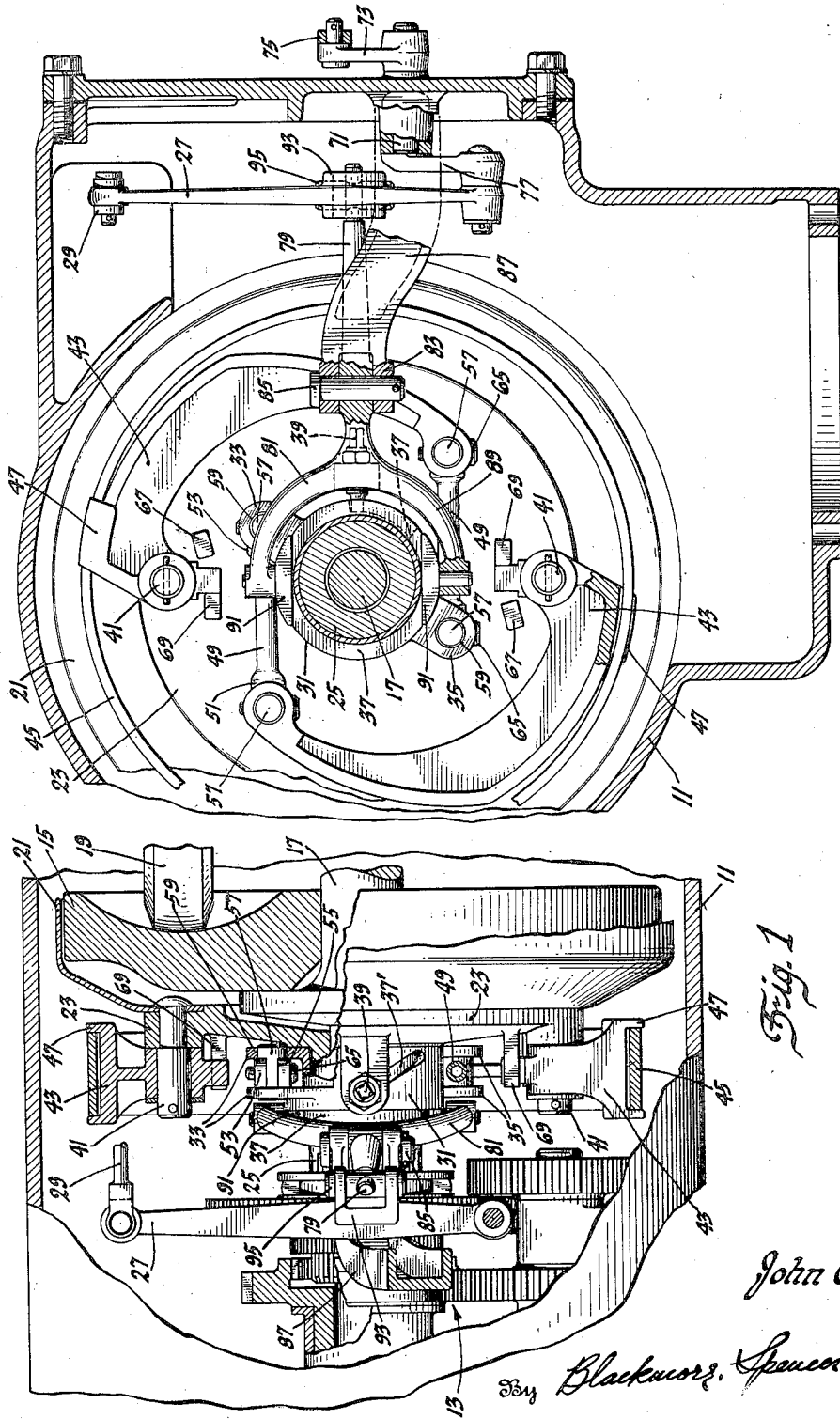

Sept. 17, 1935.  J. O. ALMEN  2,014,921
HOOP TYPE GOVERNOR
Filed June 20, 1932  3 Sheets-Sheet 2
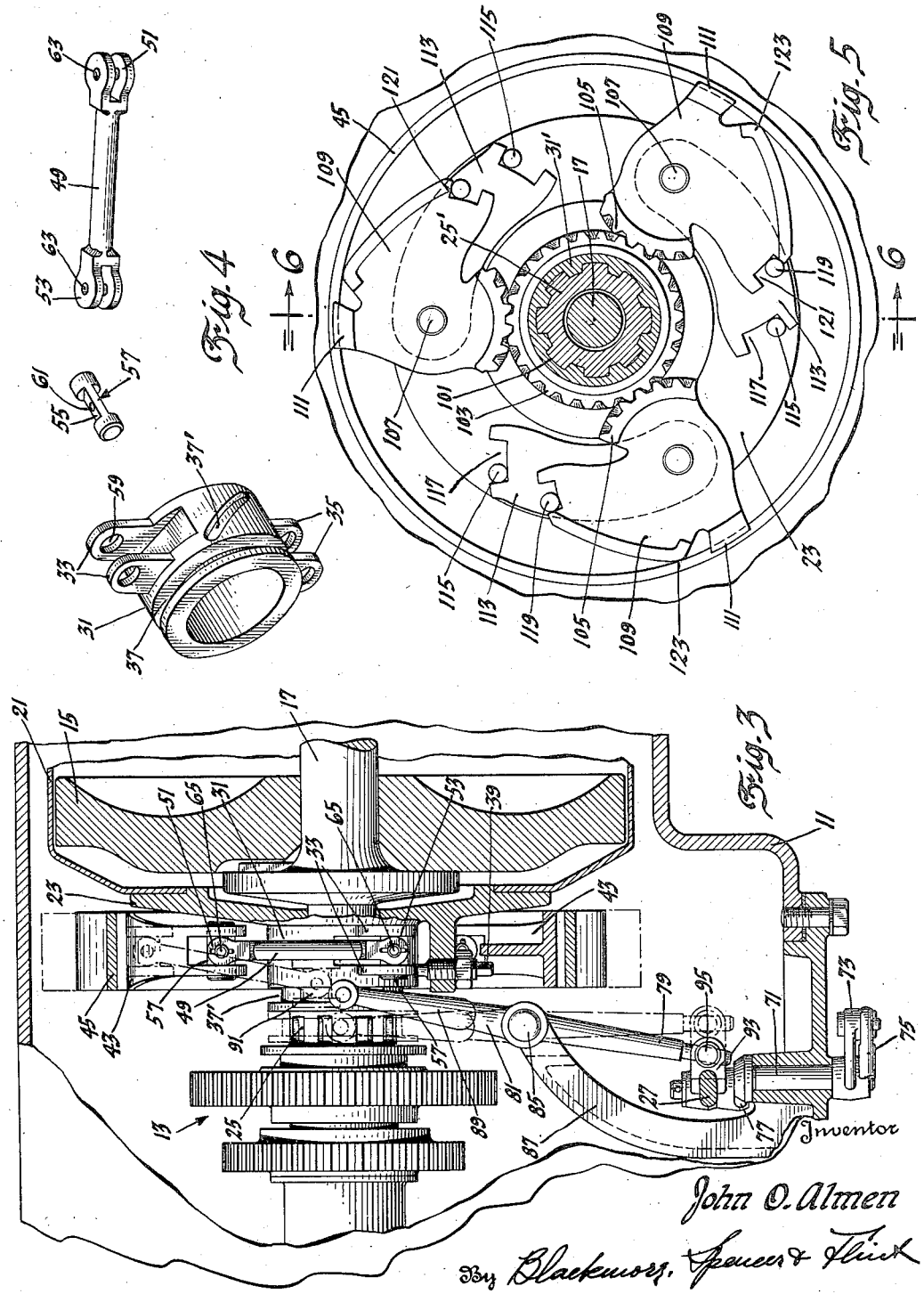

Sept. 17, 1935.  J. O. ALMEN  2,014,921
HOOP TYPE GOVERNOR
Filed June 20, 1932  3 Sheets-Sheet 3

Inventor
John O. Almen
By Blackmore, Spence & Flint
Attorneys

Patented Sept. 17, 1935

2,014,921

UNITED STATES PATENT OFFICE 2,014,921

HOOP TYPE GOVERNOR

John O. Almen, Royal Oak, Mich., assignor, by mesne assignments, to General Motors Corporation, Detroit, Mich., a corporation of Delaware Application June 20, 1932, Serial No. 618,221

5 Claims. (Cl. 264—16)

This invention relates to speed-responsive governors. It is of use in many relations where the speed of one mechanism functions to control another mechanism. It has been designed for use in connection with change speed transmission for motor vehicles, and more especially for an infinitely variable type of friction transmission wherein the speed ratio is controlled by the governor which is mounted to be responsive to the speed of one of the shafts, preferably the input shaft.

An object of the invention is to provide a speed governor of extreme simplicity and one comprising few easily machined parts; and a governor which responds with minimum lag. Such a governor has particular utility in a vehicle where it must operate over a wide range of speeds and in which use it may be subject to rapid speed variations.

Among more specific objects, the novel governor provides an anti-friction contact between its centrifugal weights and hoop type springs; it provides for small hinged pin loads at high speeds; it provides smooth action and freedom from oscillation; it is particularly adaptable for being mounted on the input drum of a double toric friction transmission giving a large radius for the flyweights and consequently high power at low speeds. When so mounted it is quite sufficient to shift the so-called single roller control transmission directly without the use of intermediate servo mechanism or step-up gearing. Its characteristics are reproducable in production without need for adjustment.

Very briefly described it comprises opposite flyweights mounted on drum or driving flange pivots. The weights move in a plane transverse to the driving shaft carrying the flange or drum and are restrained by a hoop spring (or springs). This hoop spring is preloaded when the device is used to control the transmission ratios by initially stretching the hoop or hoops over the flyweights. The motion of the weights against the resistance of the spring hoop is transferred to a collar or a sleeve which may shift axially along the driven shaft and the axial movement of which may be transmitted by suitable connections to change the transmission driving ratios. The desired car characteristics are predetermined by the proportioning of the governor parts and by the characteristics of the linkage between the governor weights and the collar and between the collar and the control elements of the transmission.

The invention is illustrated in the accompanying drawings in which Fig. 1 is a view in elevation of a housing for a reverse gear shifting device and for a frictional change speed transmission.

Fig. 2 is a view in end elevation showing the novel governor.

Fig. 3 is a horizontal sectional view.

Fig. 4 illustrates in perspective certain parts in disassembled relation.

Fig. 5 is an end elevation of a modified form.

Figure 6:
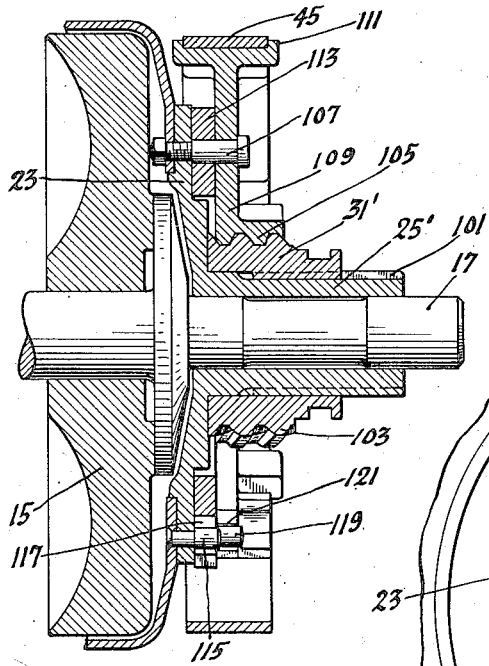
Fig. 6 is a view in section on line 6—6 of Fig. 5.

Referring first to Figs. 1 to 4 inclusive, numeral 11 designates the housing for the reversing gearing 13 which may assume any preferred form and need not be described in detail, and for a ratio changing transmission illustrated to the extent of showing one disc 15 (in this case a driven disc on driven shaft 17), and one of the rollers 19 by which the disc 15 with its shaft 17 is rotated from a driving disc, not shown. The driving disc may be itself rotated by a barrel member 21 carried by a flange 23 which is rigid with the input shaft 25 driven by the gearing 13 and entering the change speed unit.

The transmission is of that kind wherein the rollers, of which 19 is typical, are tilted between the driving and driven discs by mechanism not illustrated but actuated through the instrumentality of a lever 27 and a link 29. The lever is to be rocked by a governor associated with and responsive to the rotation of input shaft 25 with the flange 23. Under the influence of this governor acting through the lever 27 and the link 29, the ratio of the transmission is controlled.

Slidable on shaft 25 is a sleeve or collar 31. This collar has opposed pairs of arms 33 and 35. Adjacent one axial end of the collar is an annular groove 37. On the outer periphery of the collar is a helical groove 37'. A pin 39, carried by flange 23, enters the helical groove so that when the collar 31 is rotated relative to shaft 25 the axial component of the helical groove cooperating with the pin 39 produces an axial reciprocation of the collar.

Pivoted to the flange 23 by pins 41 are weights 43 surrounded by a spring hoop 45. Adjacent the pivots the weights have flanges 47 to center the spring hoop. The ends of the weights remote from their pivots are linked to the collar by the following construction. Numeral 49 shows a link pivoted at its forked end 51 to the end of a weight. The other forked end 53 of link 49 is pivoted to the collar. The drawing shows the kind of connection preferred. Each forked end straddles the flattened part 55 of a pin 57, the rounded ends of which are received within openings 59 in the parts 33 and 35 of the collar, and in similar openings at the end of the weight. The pin 57 is apertured as at 61 to register with apertures 63 in the forked ends of the link to receive a pivot pin 65. On the flange 23 are lugs 67 located to limit the outward rotation of the weights under the influence of centrifugal force. It will be understood that initially the hoop is of nearly circular shape and that it is deformed when the weights rotate. In order that the spring may be normally preloaded other stops 69 are provided. Obviously in assembly the spring hoop is somewhat deformed to surround the weights which are then held by the spring against the stops 69. Preferably the weights have their outer walls so designed that they engage the hoop over a region progressively more distant from the pivot. To secure the desired governor characteristics the cam shape of the weights may be modified as desired.

From the above description it will be understood that the rotation of the governor weights acts through the links 49 to rotate the collar and that the collar, owing to its pin and helical slot connection, is reciprocated along the axis of the shaft.

The reciprocation of the collar is used to change the speed ratio of the transmission in the following manner: A shaft 71 is pivoted to the housing as shown in Figs. 2 and 3. Shaft 71 has an outer crank arm 73 to the end of which is connected a link 75. This link is designed for operation by any preferred means convenient to the operator. No invention is herein claimed for any specific operating connection for pulling upon crank arm 73 and rotating shaft 71. Shaft 71 also has an inner crank arm 77 to the end of which is connected one end of the differential lever 27. The movement of the upper end of lever 27 is operable by means of a suitable connection to change the tilting of the roller and the ratio of the transmission. Lever 27 is also connected to the stem 79 of a fork 81. Fork 81 is pivoted at 83 by a pin 85 to an arm 87 forming a part of the housing. Its forked end, designated by 89, carries pivotally connected blocks 91 which are located in the groove 37 of the sleeve 31. The lever 27 has an intermediate forked portion 93 in which is rotatably mounted a block 95 through an opening in which extends the end of stem 79. When the governor slides the collar 31, the forked lever 81 rocks on its pivot pin 85 and thereby rocks the lever 27 about its lower end connection with crank arm 77 as a fulcrum. This movement of lever 27 operates through the link 29 to change the speed ratio by mechanism constituting no part of this invention. Again, if the mid portion of lever 27 is considered as held fixed by the stem 79 of lever 81, manual effort acting through the crank arm 73 is operable to rock lever 27 and change the driving ratio.

The invention may be embodied in many similar forms. In Fig. 5 is shown one modification. In this form the spring hoop is marked 45 as before. The driven shaft is also designated by numeral 17. The driving shaft 25' has a splined connection at 101 with the inner periphery of a collar 31'. On its outer periphery the collar has helical teeth 103 meshing with similar teeth 105 on weights 109 pivoted at 107 to the flange 23 of the driving shaft. The longitudinal component of the helical gearing is made use of to effect the sliding of the collar as the weights rotate under the influence of centrifugal force. The connections from the collar to operate the speed-changing mechanism may be the same as before. The outer portion of weight 109 has flanges 111 to straddle and position the hoop 45. Also provided on pin 107 is a second weight 113. A stop pin 115 carried by the flange 23 is arranged within a slot 117 at the end of weight 113. A pin 119 is provided on weight 113, which pin 119 enters a slot 121 at the end of weight 109. The operation of this form of the invention is substantially as follows: When the vehicle is at rest the resiliency of the spring hoop 45 engaging the contact points 123 of the weights 109 holds the collar in that position corresponding to a low speed driving ratio. As the engine speed increases the rate of rotation of flange 23 increases and centrifugal force first influences the low speed weight 113. This weight swings on its pivot 107. In doing so its pin 119 rotates the weight 109, the rotation being resisted by the engagement of the weight 109 with the hoop at point 123. The rotation of weight 109 operates to reciprocate the sleeve 31' as before. The rotation of weight 113 is limited by the engagement of the pin 115 with the end of the slot 117. The weight 109 which is the high speed weight has a rotation independent of that of said weight 113 as is provided for by the slot 121 which permits a limited swinging of weight 109 relative to the low speed weight 113. This form of the device is therefore what may be designated as a two-stage governor, a first stage wherein the low speed weight 113 is operable and a second stage wherein the high speed weight 109 functions. By the use of a two-stage governor the characteristics of the ratio changing mechanism is modified. The additional resistance brought into action by weight 109, acting independently of weight 113, retards the shifting toward the high speed ratio and improves engine performance.

Figure 7:
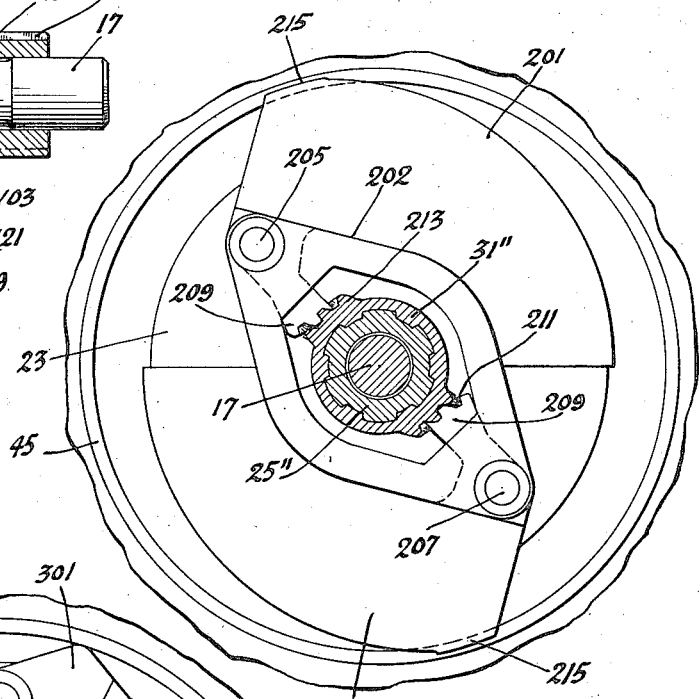
Fig. 7 is an end elevation of another form of the invention.

In Fig. 7 is a form of the invention in which two weights 201 and 203 are pivoted to a carrier 202 supported on the flange 23. The weights are pivoted to the carrier by pivots 205 and 207. At 45 is shown the spring ring as before. The weights 201 and 203 have radially-directed inner arms 209 with spiral teeth 211 meshing with similar teeth 213 on the collar 31''. This collar is splined to the driving shaft 25'' as illustrated. The driven shaft 17 is indicated as before. The hoop is centered by means of flanges 215. The outer periphery of each weight is shaped as shown to produce progressive engagement. Obviously changes may be made in the contour of the engaging surfaces of the weights to produce any desired characteristics.

Figure 8:
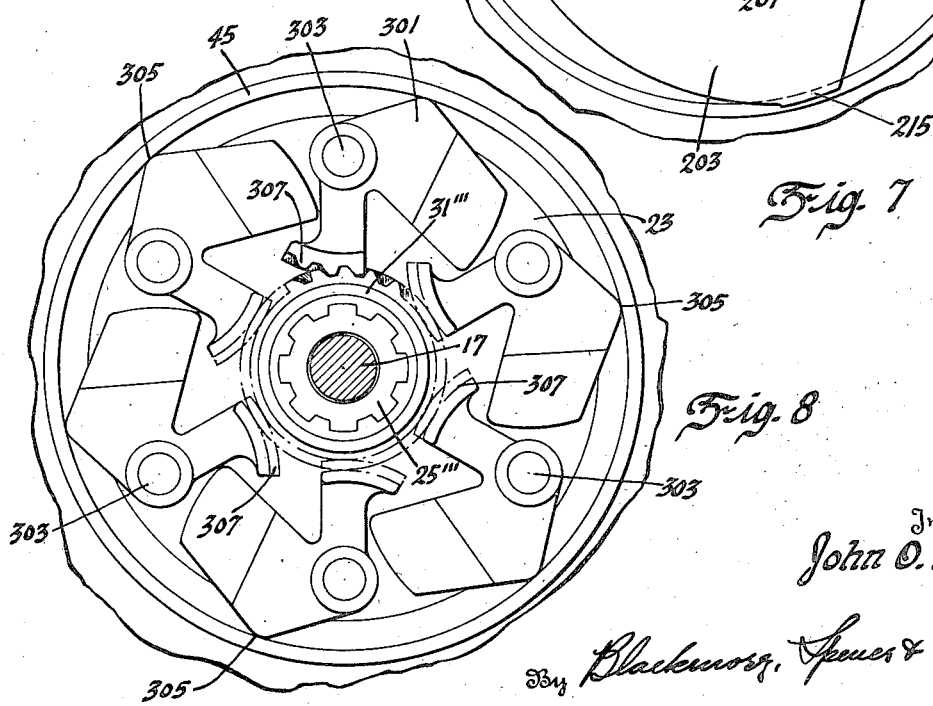
Fig. 8 is a similar view of a still further embodiment.

Fig. 8 shows a comparatively simple form of the invention. In this numeral 17 is the driven shaft, 25''' the driving shaft, and 31''' the collar. The weights 301 are pivoted to the flange 23 as at 303. Each weight has on one arm a rolling contact at 305 with the spring ring 45. Its other arm has a helical gear element 307 meshing with a similar gear element on the collar. As the weights fly about their pivots and deform the ring 45 they reciprocate the collar and shift the gear ratio as in the forms previously described. The rolling contact point at 305 is so located with respect to the center of gravity of the weight as to reduce to a minimum the load on the pivots.

It will be understood that the characteristics of the governor as set forth at the beginning of this description are inherent in the structure as described. It will also be understood that such a governor, while useful in many relations, is particularly useful when associated with a transmission of the friction roller type.

I claim:

1. In a speed governor for a change speed transmission, ratio changing means, a spring hoop, a plurality of mechanisms engaging and operable to deform said hoop, each mechanism comprising a plurality of weights including a low speed weight operable under relatively low centrifugal force, and a second high speed weight responsive to higher centrifugal forces, and connections whereby said weights are adapted to shift the ratio of said ratio changing means toward higher driving rates.

2. In the invention defined by claim 1, the low speed weight having means to contact with and move the high speed weight together with means to limit the rotation of the low speed weight, and the high speed weight being recessed adjacent said means for movement relative to the low speed weight.

3. In the invention defined by claim 1, the low speed weight having means to contact with and move the high speed weight together with a stop to limit the rotation of the low speed weight and the high speed weight being recessed adjacent said means for movement independently of the low speed weight, and means to limit the movement of the high speed weight relative to the low speed weight.

4. In a speed responsive governor for a variable ratio change speed transmission, a spring hoop, low speed and high speed weights operable to deform said hoop, said weights responsive to unequal centrifugal forces, means operable by the rotation of the high speed weight whereby the governor is adapted to shift the ratios of said transmission and mechanism through which the low speed weight rotates the high speed weight whereby the low speed weight and the high speed weights operate successively under the influence of centrifugal force through said means.

5. The invention defined by claim 4, mechanism for performing said functions comprising a pin and slot connection between the low speed weight and the high speed weight, and a pin engaging the low speed weight to limit the outward swinging thereof.

JOHN O. ALMEN.